United States Patent [19]
Linden

[11] Patent Number: 5,266,977
[45] Date of Patent: Nov. 30, 1993

[54] LENS DEVICE AND METHOD

[76] Inventor: Harry A. Linden, 146 Sierra Vista Rd., Santa Barbara, Calif. 93108

[21] Appl. No.: 729,057

[22] Filed: Jul. 12, 1991

[51] Int. Cl.⁵ ............................................. G02C 9/00
[52] U.S. Cl. ........................................ 351/47; 351/57; 351/158
[58] Field of Search .......... 351/57, 47, 158, 48, 351/49, 128, 58

[56] References Cited
U.S. PATENT DOCUMENTS 3,236,579  2/1966  Evans ..................... 351/47
4,542,965  9/1985  Shedrow .................. 351/57

Primary Examiner—Rodney B. Bovernick
Assistant Examiner—Hung Xuan Dang
Attorney, Agent, or Firm—Stuart E. Kriegel

[57] ABSTRACT

The lens device includes a lens joined to a lens holder member, the lens holder member having a diverging wall portion that permits suction mounting of the lens device onto a substantially smooth surface. The lens is held by the lens holder member to permit a field of view through the lens and through any surface upon which the lens device is mounted. The lens device is thus conveniently mountable upon the lens of an eyeglass or goggle, the screen of a monitor or radar scope or any other device where it would be beneficial to magnify a selected field of view. Suction mounting of the lens device permits easy removal and relocation of such device on a selected surface or relocation onto an entirely different surface. The lens device is also combinable with an appliance such as a digital stopwatch to provide a module that is suction mountable onto a pair of goggles. A swimmer is thus enabled to keep track of elapsed time while swimming.

20 Claims, 3 Drawing Sheets

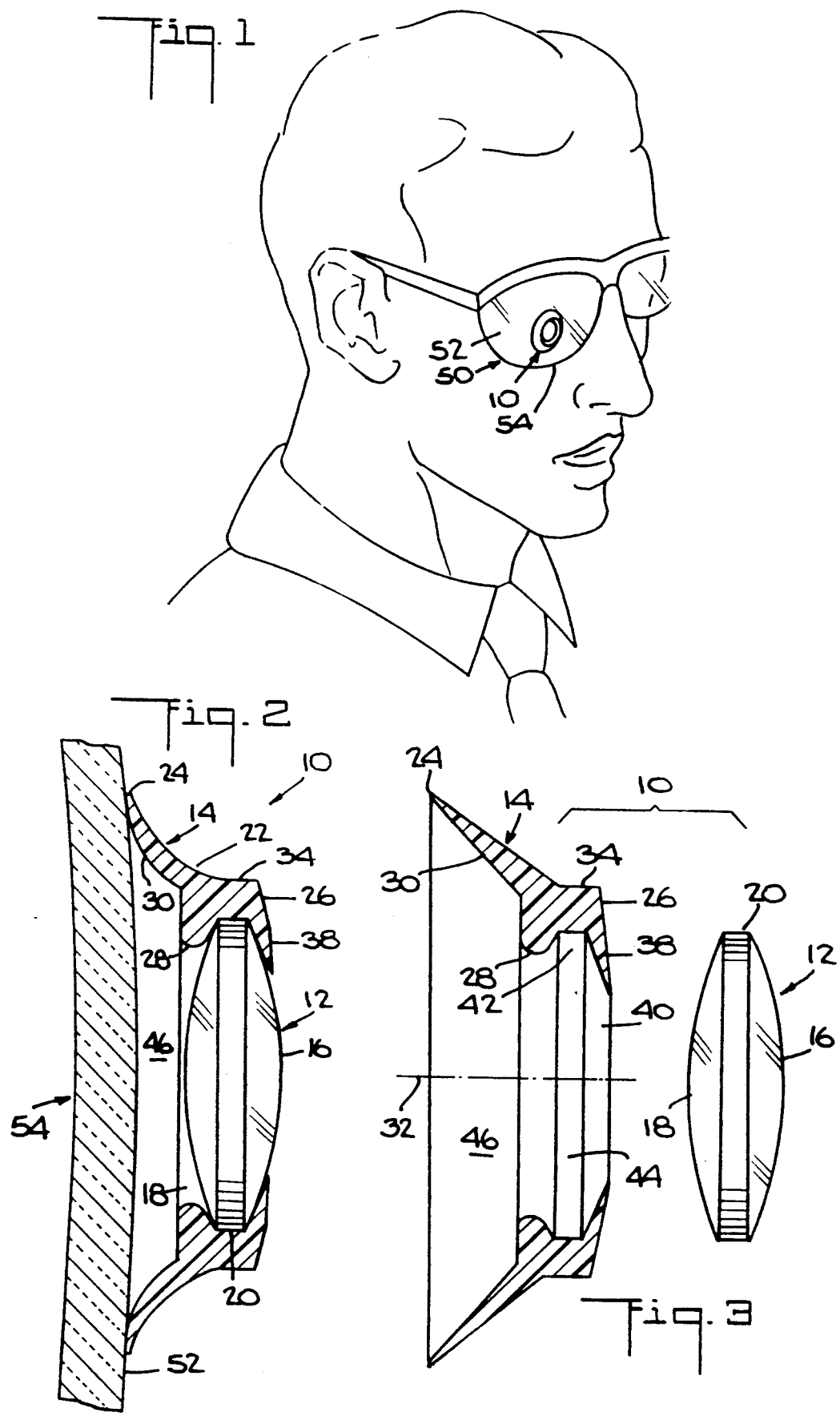

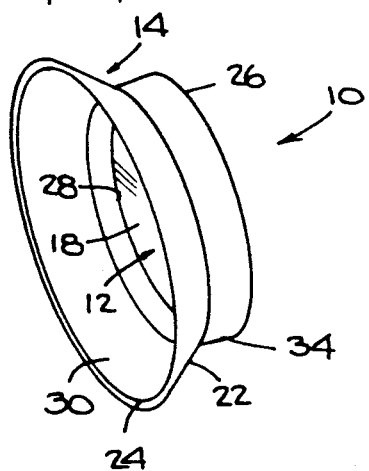
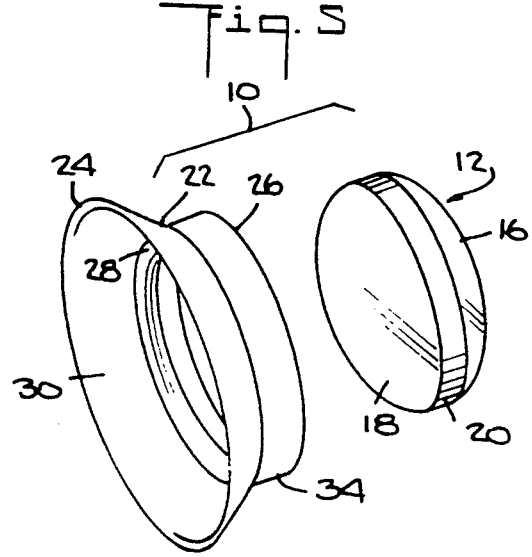
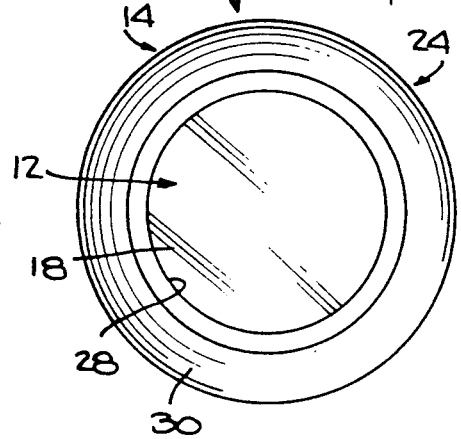
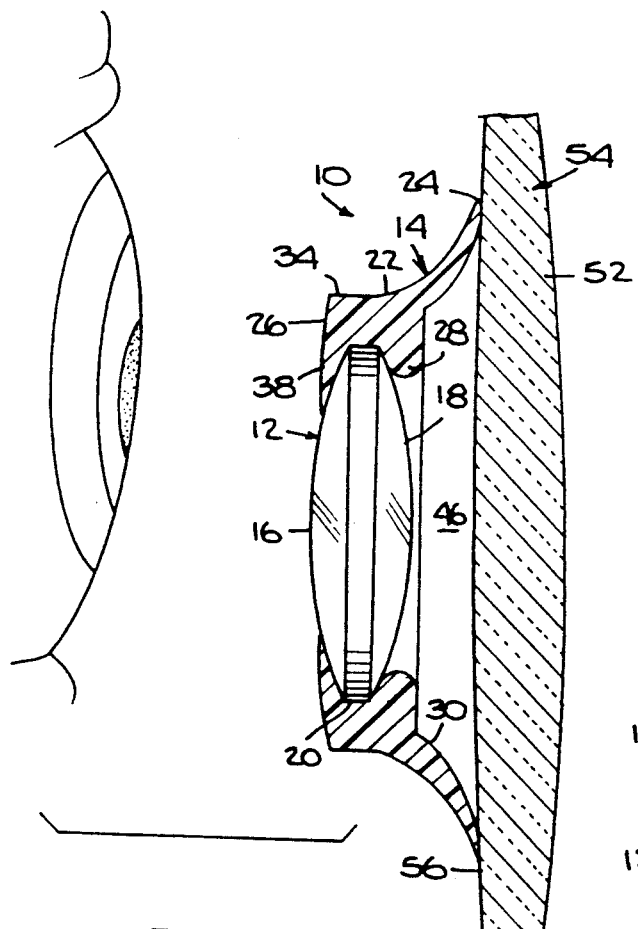
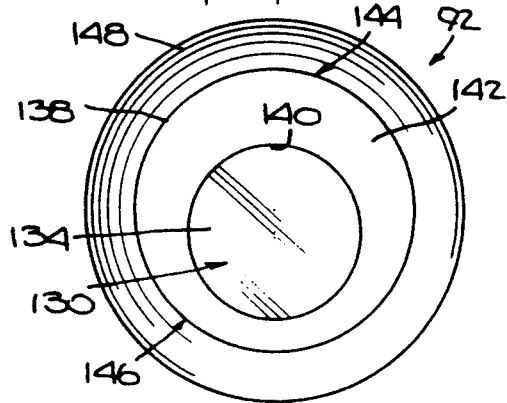

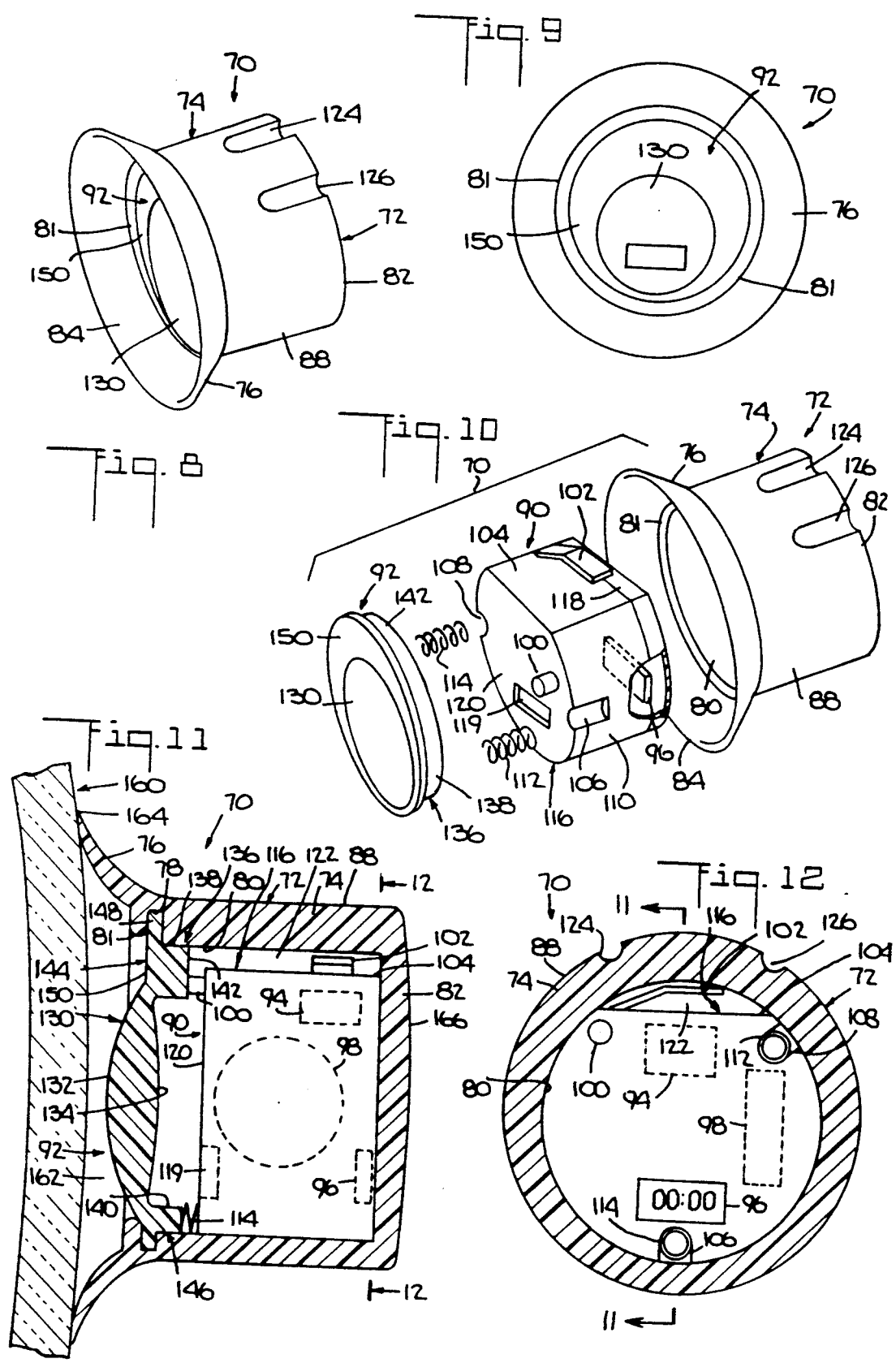

LENS DEVICE AND METHOD

BACKGROUND OF THE INVENTION

This invention is directed to auxiliary lens devices and more particularly to a surface mounted lens device that is held in place by suction.

U.S. Pat. No. 4,796,987 for Digital Display for Head Mounted Protection shows goggles such as used by a swimmer, with a primary transparent lens for general viewing and a smaller auxiliary lens bonded to the primary lens. The auxiliary lens, which is bonded to an interior surface of the primary lens, focuses on a miniature digital stopwatch bonded to an exterior surface of the primary lens. Thus a swimmer, while wearing the goggles, is enabled to keep track of his or her elapsed time during swimming. Since the auxiliary lens and the stopwatch are bonded to the primary lens, it is not feasible to reposition the lens and stopwatch or remove these items for relocation onto another set of goggles.

Jewelers and watchmakers are known to use an auxiliary lens device such as an eye loupe by itself or in combination with head frames for magnification of a gemstone or the inner workings of a watch. If an individual has need to wear eyeglasses or other head mounted visual device such as goggles for eye protection, it may be cumbersome to wear another head mounted auxiliary viewing device such as the eye loupe. Use of binoculars, telescopes and magnifying glasses can also be inconvenient when the user already wears glasses and the need for such auxiliary lens device is frequent and intermittent.

It is thus desirable to provide an auxiliary lens device that can be detachably mounted onto a smooth surface such as eyeglasses or a face shield to provide a desired magnification or telescopic viewing of an object.

OBJECTS AND SUMMARY OF THE INVENTION

Among the several objects of the invention may be noted the provision of a novel lens device which can be held in place by suction, a novel lens device that can be suction mounted onto eyeglasses or goggles to provide auxiliary viewing while still permitting normal use of the eyeglasses and goggles, a novel suction mounted lens device that can be easily installed on a smooth surface and easily removed from such surface, a novel suction mounted lens device and appliance combination, and a novel method of viewing an object through a lens.

Other objects and features of the invention will be in part apparent and in part pointed out hereinafter.

In accordance with the invention, the lens device includes a lens holder member and a lens joined to the lens holder member. The lens and the lens holder member can be separately formed or made as an integral unit.

The lens holder member is formed with a flexible divergent wall portion having a free end that is engagable with a substantially smooth surface. The lens that is held by the lens holder member forms an air-tight partition across the wall of the lens holder member such that a suction space is defined between the divergent flexible wall portion and the lens up to the free end of the wall. The divergent wall portion is deflectable against a smooth surface to develop a desired suction that maintains the lens holder member and the lens in place on the surface. The divergent wall portion is also distortable to break the suction force and permit detachment of the lens device from the surface.

The ease with which a suction force can be developed and relaxed enables the lens device to be selectively positioned, removed and repositioned at a plurality of locations on eyeglasses, goggles, and windows, for example, to permit auxiliary viewing or focusing of an object through the lens carried by the lens device. If the lens device is placed on a window, light can be focused through the window as desired by the user.

The lens device can be made relatively small so that it will enable hobbyists such as stamp collectors, numismatists or professionals such as jewelers, tool makers, archaeologists and biologists to have an auxiliary view through regularly worn eyeglasses. The auxiliary view is obtainable without having to remove the eyeglasses and permits frequent or occasional magnification or telescopic viewing of an object in a convenient manner when the need arises. When use of the lens device is completed, the user has the option of removing the lens device from its surface mounting by distorting the divergent wall portion to break or release the suction force.

In another embodiment of the invention the lens device is used in combination with a miniature appliance such as a data display device to show a digital indication of elapsed time. The lens device and the appliance are housed together and suction mountable to a desired surface. Such device can be applied to goggles of the type used by swimmers to provide a readout of elapsed time during laps or distance swimming.

The invention accordingly comprises the constructions and method hereinafter described, the scope of the invention being indicated in the claims.

DESCRIPTION OF THE DRAWINGS

In the accompanying drawings,

FIG. 1 is a simplified schematic perspective view of a lens device incorporating one embodiment of the invention, installed on the exterior surface of a pair of conventional eyeglasses;

FIG. 2 is an enlarged side view thereof, partly shown in section, on an exterior surface of an eyeglass lens;

FIG. 3 is an exploded view thereof;

FIG. 4 is a perspective view thereof;

FIG. 5 is an exploded perspective view thereof;

FIG. 6 is a plan view thereof;

FIG. 7 is a view similar to FIG. 2 showing the lens device positioned on the inside surface of an eyeglass lens;

FIG. 8 is a simplified perspective view of another embodiment of the invention;

FIG. 9 is a plan view thereof;

FIG. 10 is an exploded perspective view thereof;

FIG. 11 is a sectional view thereof taken on the line 11—11 of FIG.

FIG. 12 is a sectional view thereof taken on the line 12—12 of FIG. 11; and

FIG. 13 is a bottom plan view of the lens thereof.

Corresponding reference characters indicate corresponding parts throughout the several views of the drawings.

DETAILED DESCRIPTION OF THE INVENTION

A lens device incorporating one embodiment of the invention is generally indicated by the reference number 10 in FIGS. 1-7.

The lens device 10 includes a disc shaped lens 12 supported in a generally annular lens holder member 14. Although the lens 12 and the lens holder member 14 are described as separate components, they can be integrally formed as a single unit.

The lens 12 can be formed of glass or a suitable clear transparent plastic such as a polycarbonate or acrylic of good optical quality. The lens 12 has two convex surfaces 16 and 18 and a generally cylindrical peripheral portion 20.

The lens holder member 14 includes a wall 22 that is annular in cross-section and has opposite ends 24 and 26. The lens holder member 14 can be formed of a clear transparent plastic material, preferably vinyl. An annular flange 28 projects radially inwardly of the wall 22 intermediate the ends 24 and 26. A wall portion 30 between the annular flange 28 and the end 24 diverges from an axis 32 (FIG. 3) of the lens holder member 14 in a direction from the end 26 to the end 24.

A wall portion 34 (FIG. 3) between the annular flange 28 and the end 26 has a tapered flange 38 that projects radially inwardly toward the axis 32. An opening 40 (FIG. 3) at the end 26 defined by the tapered flange 38 converges in a direction from the end 24 to the end 26. The flanges 28 and 38, which are axially spaced, thus define an annular pocket 42 in the lens holder member 14 for reception of the lens 12.

An inner peripheral surface 44 of the wall portion 34 has a diametrical magnitude sized to permit leak-tight accommodation of the lens 12 in the annular pocket 42. The flange 28 thus bears against the flat surface 18 of the lens 12 and the tapered flange 38 bears against the convex surface 16 of the lens 12. The flexible resiliency of the lens holder member 14 snugly secures the lens 12 within the annular pocket 42 of the lens holder member 14. If desired, any suitable bonding agent can be used to enhance the leak-tight joint between the lens holder member 14 and the lens 12.

With the lens 12 thus disposed in the lens holder member 14, a suction space 46 is defined between the diverging wall portion 30 and the lens 12.

In use, the lens device 10 can be placed at any desirable location on a pair of eyeglasses 50 as shown in FIG. 1 or goggles (not shown). The lens device 10 is sufficiently miniaturized to permit placement on the exterior surface 52 of an eyeglass lens 54 (FIGS. 1 and 2) while still permitting normal vision through the lens 54. The lens device 10 can thus be made small enough to present a minimally restricted normal view around the lens device 10. The user can look through the lens device 10 by directing the field of vision in the same manner used when looking through a selected section of a bifocal lens. Thus, depending upon the particular needs of a user, the lens device 10 can be positioned at any selected location on the lens surface 52.

The lens device 10 can also be placed on an interior surface 56 of an eyeglass lens 54 as shown in FIG. 7 or on both the interior and exterior surfaces (not shown) of the lens 54. In this manner, a user can develop combinations of magnification or telescopic powers to view a selected object or objects. In addition, a lens device 10 can be used on each lens of a pair of eyeglasses or goggles (not shown) to provide three dimensional viewing of an intended object.

A module incorporating another embodiment of the invention is generally indicated by the reference number 70 in FIGS. 8-13.

The module 70 includes a casing 72 having a wall 74 (FIG. 12) that is annular in cross-section. The wall 74 includes a diverging wall portion 76 similar to the diverging wall portion 30 of the lens device 10.

A peripheral groove 78 (FIG. 11) is formed at an inner surface 80 of the wall 74 thus defining a flange 81. The casing 72 further includes a closed base end 82 and an opposite open end 84 defined by the diverging wall portion 76.

The casing 72 has a generally cylindrical profile between the diverging wall portion 76 and the base end 82 with an outer surface 88 that is nonconcentric with the inner surface 80. Thus, the thickness of the wall 74 is nonuniform as most clearly shown in FIG. 12.

An appliance such as a digital stopwatch 90 (FIG. 10) is disposed in the casing 72 intermediate the base end 82 and a lens 92 as most clearly shown in FIG. 11. The digital stopwatch 90 includes an appropriate conventional electric circuit or central processing unit 94 for driving a transmissive or transparent liquid crystal display 96. A conventional battery 98 powers the central processing unit 94 and the liquid crystal display 96 to provide a digital readout of elapsed time in any selected time increments. Thus the elapsed time can be indicated as seconds and hundredths of a second or, if desired, minutes and seconds.

The central processing unit 94 is conventionally programmed to respond to conventional external mechanical actuation through a depressible key 100 and a contact plate 102. Depression of the key 100 starts the running of time on the liquid crystal display 96. Subsequent depression of the key 100 stops the timer. The contact plate 102 is pivoted at a surface 104 of the stopwatch 90. Recesses or grooves such as 106 and 108 (FIG. 10) formed at the periphery 110 of the stopwatch 90 accommodate return springs 112 and 114.

The body or housing 116 of the stopwatch 90, which can be formed in two sections as indicated by the line 118 in FIG. 11, is preferably a plastic such as polycarbonate or ABS to permit a clear view of the liquid crystal display 96 through an aperture window 119 on a surface 120 of the housing 116.

As most clearly shown in FIG. 12, the return springs 112 and 114 and the key 100 are located proximate the annular wall 74. Also as shown in FIG. 12, the contact plate 102 is disposed proximate the annular wall 74 in a space 122 defined between the surface 104 and the annular wall 74. A pair of touch grooves 124 and 126 are formed in the outer surface 88 of the wall 74 to indicate the location of the contact plate 102.

The lens 92 can be formed of the same material as the lens 12 and includes a viewing section 130 having curved convex surfaces 132 and 134. The lens 92 also includes a peripheral footing 36 extending toward the housing 116 of the digital stopwatch 90 as most clearly shown in FIG. 11. The peripheral footing 136 includes a radially outer footing surface 138, a radially inner footing surface 40 and a base footing surface 142.

As most clearly shown in FIG. 13, the radially outer and radially inner footing surfaces 138, 140 are non-concentric such that the thickness of the footing 136 varies from a maximum thickness at reference number 144 to a minimum thickness at reference number 146. A flange portion 148 projects radially beyond the footing surface 138 for engagement in the peripheral groove 78 of the casing 72 as most clearly shown in FIG. 11.

The diametrical magnitude of the radially outer footing surface 138 of the lens 92 and the inner surface 80 of the casing 72 are sized to ensure a snug leak-tight engagement between the casing 72 and the lens 92. The leak-tight engagement between the lens 92 and the casing 72 is further enhanced by accommodation of the flange portion 148 in the peripheral groove 78. Any suitable known bonding agent can also be used to enhance the leak-tight joint.

A top surface 150 of the footing 136 which extends radially beyond the viewing section 130 can be treated in any suitable known manner such as by bead blasting to restrict the field of view of the lens 92 only through the viewing section 130.

Referring to FIGS. 11 and 13, the lens 92 is disposed in the casing 72 such that the maximum thickness section 144 aligns with the space 122 that contains the contact plate 102, and the minimum thickness section 146 aligns with the radially opposite portion of the casing 72. Under this arrangement the base footing surface 142 of the lens 92 overlaps the key 100 and the return springs 112 and 114 as shown in FIG. 11. The front surface 20 of the housing 116 from which the key 100 and the springs 112 and 114 project, is spaced a predetermined distance from the base footing surface 142.

The viewing section 130 of the lens 92 thus permits a clear view of the liquid crystal display 96 through the aperture window 19 on the front surface 120 of the housing 116.

In using the module 70, the casing 72 is suction mounted to a smooth surface such as a lens 160 of a swimmer's goggles, as shown in FIG. 11, by pressing the diverging wall portion 76 against the lens surface 164. A suction space 162 defined between the lens 92 and the flexible diverging wall portion 76 permits the module 70 to be suction mounted to any selected position on the goggle lens 160. Preferably the module 70 is mounted to an exterior surface 164 of the goggle lens 160 at a position which does not interfere with normal viewing through the lens 160. This objective is achieved by miniaturizing the module 70 so that it provides minimum restriction on normal viewing through the goggle lens 160.

For example, the outside diameter of the diverging wall section 76 can be approximately 0.75 inches. The outside diameter of the casing 72 can be approximately 0.50 inches and the height of the casing 72 measuring from the open end of the diverging wall portion 76 to the closed base end 82 can be approximately 0.54 inches. The lens 92 is appropriately sized to fit within the casing 72 and can have an outside diameter at the flange portion 148 of approximately 0.578 inches with the diameter of the viewing section 130 being approximately 0.355 inches. The lens center thickness can be approximately 0.090 inches. The thickness of the flange portion 148 can be approximately 0.025 inches and the axial extent of the footing 146 can be approximately 0.080 inches up to the flange 148.

The digital stopwatch 90 is operable by pressing the casing 72 between the touch grooves 124 and 126 to deflect the wall 74 against the contact plate 102. The contact plate 102 is thus pivoted toward the surface 104 thereby resetting the liquid crystal display 96 to zero.

To start the timer, the base end 82 is pushed or axially deflected to force the housing 116 toward the base footing surface 142 such that the key 100 is depressed by engagement with the base footing surface 142. The return springs 112 and 114 urge the housing 116 back to its normal position.

It will be noted that although the force necessary to urge the housing 116 against the base footing surface 142 is less than the force needed to deflect the diverging wall portion 76 against the goggle surface 164 to develop suction within the suction space 162, it serves to enhance the suction attachment. The liquid crystal display 96 can be stopped by a subsequent depression of the key 100 initiated by pressing the closed end 82 of the casing 72 which also serves to enhance the suction attachment.

The digital stopwatch 90 can thus be controlled by external manipulation of the casing 72 without interfering with the suction mounting of the module 70. The touch grooves 124, in addition to locating the contact plate 102, indicate the upper orientation of the module 70.

The module 70 is removable from the goggle lens 160 by breaking or relaxing the suction force within the suction space 162. Such relaxation or breaking of the suction force is accomplished by pinching the diverging wall portions 76. The module 70 can thus be repositioned on the goggle lens 160 or relocated onto another set of goggles.

Some advantages of the present invention evident from the foregoing description include an auxiliary lens device that can be detachably mounted on a smooth surface to provide a special purpose viewing of an object. In addition to uses already described, the lens device could also be attached to a monitor such as a CRT or radar scope to magnify a particular area without modifying the entire visual image. The lens device allows eyeglass wearers with monofocal lenses to easily adapt a close-up reading lens capability such as is presently accomplished with bifocal or trifocal lenses. The lens device may be in any functional shape so long as the suction cup remains a continuous closed shape. Examples of suction cup shapes are circles, elipses, ovals and rectangles with rounded corners. The size of the lens device would correspond to its intended use. Since the lens device is suction mounted, it can be easily removed and repositioned or relocated onto another surface.

The lens device can be combined with an appliance such as a digital stopwatch in modular form such that the entire module is surface mounted for convenient location onto a surface and removal therefrom when desired.

In view of the above, it will be seen that the several objects of the invention are achieved and other advantageous results attained.

As various changes can be made in the above constructions and method without departing from the scope of the invention, it is intended that all matter contained in the above description or shown in the accompanying drawings shall be interpreted as illustrative and not in a limiting sense.

What is claimed is:

1. A lens device comprising a lens holder member and a lens joined to said holder member, said lens holder member including means for forming a suction attachment of said lens holder member onto a substantially smooth surface, said lens holder member having an annular wall with a flexible radially deflectable portion, said lens having a peripheral portion engaging said annular wall such that the radially deflectable portion depends from said lens, and said means for forming a suction attachment includes the flexible deflectable portion of said wall depending rom the periphery of said lens.

2. The lens device as claimed in claim 1 wherein said means for forming the suction attachment includes a flexible wall portion having a free end for contacting the substantially smooth surface.

3. The lens device as claimed in claim 2 wherein the free end has a closed periphery and is of a shape selected from the group consisting of circles, ellipses, ovals, and rectangles with rounded corners.

4. The lens device as claimed in claim 2 wherein said lens is spaced from the free end of said wall portion.

5. The lens device as claimed in claim 2 wherein said lens and said flexible wall portion define a suction space.

6. The lens device as claimed in claim 1 further including means for holding an appliance within said lens holder member a predetermined distance from the lens to permit viewing of the appliance through the lens.

7. The lens device as claimed in claim 6 wherein said means for forming a suction attachment includes a flexible wall portion having a free end for engaging the substantially smooth surface and the means for holding said appliance include an extension portion of said lens holder, said extension portion being a continuation of said flexible wall portion.

8. The lens device as claimed in claim 6 further comprising said appliance wherein said appliance is a data display device.

9. The lens device as claimed in claim 8 wherein said data display device is a timer with a digital readout.

10. The lens device as claimed in claim 1 wherein said lens holder is formed of a transparent material.

11. The lens device as claimed in claim 1 wherein said lens and said lens holder are integrally formed in one piece.

12. The lens device as claimed in claim 1 wherein the lens holder member has two opposing end portions, one of said end portions holding said lens and said other end portion being open.

13. The lens device as claimed in claim 12 wherein said open end portion converges to said end portion holding said lens.

14. A lens device comprising a lens holder member and a lens joined to said lens holder member, said lens holder member including means for forming a suction attachment of said lens holder member onto a substantially smooth surface, said len having a peripheral portion, and said lens holder including pocket means for holding the peripheral portion of said lens.

15. The lens device as claimed in claim 14 wherein said lens holder is formed of a distortable material such that said pocket means is distortable to permit installation of said lens in said lens holder.

16. A module comprising a housing having an open end and an end opposite said open end, a lens joined to said housing to provide a field of view through said lens from said open end toward said opposite end, an appliance disposed in said housing between said lens and the opposite end of said housing to permit said field of view through said lens to focus on said appliance, said housing including means for forming a suction attachment of said housing onto a substantially smooth surface.

17. The module as claimed in claim 16 wherein said appliance is a digital timer.

18. The module as claimed in claim 16 wherein said housing has an annular wall with a flexible radially deflectable portion and said lens has a peripheral portion engaging said annular wall such that the flexible radially deflectable portion depends from said lens toward said open end and the means for forming a suction attachment include the flexible deflectable portion of said wall depending from the periphery of said lens toward said open end.

19. A method of viewing an object through a lens comprising,
a) mounting the lens within a lens holder member so as to permit viewing through the lens holder member and lens,
b) forming the lens holder member with flexible walls that permit suction attachment of the lens holder to a substantially smooth surface, and
c) securing the lens holder member to a substantially smooth surface by suction attachment of the walls, with the lens being positioned in advance of the object to be viewed.

20. The method of claim 19 including removing the lens holder member from the substantially smooth surface by distorting the walls that permit suction attachment of the lens holder member to the smooth surface.

* * * * *